United States Patent [19]

Sloan

[11] Patent Number: 5,137,700
[45] Date of Patent: Aug. 11, 1992

[54] PROCESSES EMPLOYING IODINE-IODIDE ETCHING SOLUTIONS

[75] Inventor: Hilbert Sloan, Scottsdale, Ariz.

[73] Assignee: Nelson H. Shapiro, Rockville, Md.

[21] Appl. No.: 342,587

[22] Filed: Apr. 24, 1989

Related U.S. Application Data

[63] Continuation of Ser. No. 69,100, Jul. 2, 1987, abandoned.

[51] Int. Cl.⁵ .................. C01B 7/14; C01G 7/00; C22B 11/00
[52] U.S. Cl. .................. 423/32; 75/713; 75/741; 75/744; 423/34; 423/38; 423/507
[58] Field of Search .................. 423/22, 32, 33, 34, 423/38, 39, 470, 471, 486, 507; 204/111; 75/101 R, 103, 118 R, 118 P, 121, 713, 739, 741, 743, 744

[56] References Cited

U.S. PATENT DOCUMENTS

| | | | |
|---|---|---|---|
| 861,535 | 7/1907 | Pritchard | 75/109 |
| 971,252 | 9/1910 | Clancy | 423/38 |
| 1,857,664 | 5/1932 | Schlötier | 75/101 R |
| 1,907,975 | 5/1933 | Jones | 423/470 |
| 2,304,823 | 12/1942 | Harrison | 75/118 |
| 3,431,068 | 3/1969 | Burk | 23/89 |
| 3,495,976 | 2/1970 | Bazilevsky et al. | 75/101 R |
| 3,576,620 | 4/1971 | Wilson | 75/101 R |
| 3,625,674 | 12/1971 | Jacobs | 75/101 R |
| 3,709,681 | 1/1973 | Wilson | 75/109 |
| 3,778,252 | 12/1973 | Wilson | 75/101 R |
| 3,826,750 | 7/1974 | Wilson | 75/101 R |
| 3,885,955 | 5/1975 | Lutz et al. | 75/0.5 A |
| 3,957,505 | 5/1976 | Homick et al. | 75/108 |
| 4,190,489 | 2/1980 | Bahl et al. | 156/664 |
| 4,256,704 | 3/1981 | Howard | 75/118 P |
| 4,260,451 | 4/1981 | Schmeckenbecher | 156/664 |
| 4,319,922 | 3/1982 | Macdonald | 75/108 |
| 4,319,923 | 3/1982 | Falanga et al. | 75/108 |
| 4,397,690 | 8/1983 | Vanderpool et al. | 423/38 |
| 4,557,759 | 12/1985 | McGrew et al. | 75/118 |
| 4,670,052 | 6/1987 | Stanley et al. | 75/118 R |
| 4,734,171 | 3/1988 | Murphy | 204/111 |

FOREIGN PATENT DOCUMENTS 124213 11/1984 European Pat. Off. .......... 75/118 R

OTHER PUBLICATIONS

Sloan, "New Precious Metal Reclamation Process Based On Iodide-Iodine Etching Solutions", Oct. 8, 1985.
Cotton et al., *Advanced Inorganic Chemistry*, 3rd ed. Interscience Publishers. 1972. pp. 464-465.
Handbook of Preparative Inorganic Chemistry, 2nd ed., Braver, ed. Academic Press. 1963. vol. 1, pp. 289-290.
Encyclopedia of Chemical Reactions. Jacobson, ed. Reinhold Publishing Corp. 1949. vol. III, p. 720.

*Primary Examiner*—Jeffrey E. Russel
*Attorney, Agent, or Firm*—Shapiro and Shapiro

[57] ABSTRACT

Aqueous iodine-iodide etching solutions are employed in the recovery of precious metals. Elemental iodine is precipitated from spent etching solutions and used to supply both the iodine and iodide of new etching solutions. Prior to extraction of the elemental iodine, used solutions, if not substantially contaminated, may be oxidized and recycled for further precious metal recovery. Aqueous etching solutions of hydriodic acid and iodine, or of ammonium iodide and iodine may be employed. Etching in such solutions, as well as in solutions of iodine and an alkali metal iodide, such as potassium iodide, may be accelerated by the use of small amounts of hydrogen peroxide (or equivalents) during etching.

4 Claims, No Drawings

PROCESSES EMPLOYING IODINE-IODIDE ETCHING SOLUTIONS

This is a continuation application of Ser. No. 069,100 filed Jul. 2, 1987, now abandoned.

BACKGROUND OF THE INVENTION

This invention is concerned with processes employing iodine-iodide etching solutions in the recovery of precious metals. More particularly, the invention is concerned with the use of two aqueous iodine-iodide etching solutions, comprising 1) hydriodic acid and iodine, or 2) ammonium iodide and iodine, for recovering precious metals; with the treatment of the used etching solutions to permit their reuse and/or to prepare new etching solutions from spent solutions; and with the use of hydrogen peroxide or equivalents for accelerating the etching of gold and other precious metals.

Processes employing iodine-iodide etching solutions for recovery of precious metals from ores or scrap material were proposed at least as early as 1907. The number of patents disclosing such processes is substantial. In recent years, iodine-iodide etching solutions, such as an aqueous solution of iodine and potassium iodide, have been employed in the electronics and jewelry industries for etching or stripping gold and other precious metals. Iodine-iodide etching solutions avoid the severe toxicity and waste disposal problems associated with cyanide etching solutions, but higher cost of processes using iodine-iodide etching solutions has limited their use.

In U.S. Pat. No. 3,957,505, an attempt was made to reduce the cost of precious metal recovery using an iodine, potassium iodide etching solution, by regenerating the spent etching solution and reusing it repetitively. However, the effectiveness of the etching solution is appreciably diminished by the presence and accumulation of interfering materials, such as salts of base metals. Furthermore, when, after repeated reuse-regeneration cycles, iodine is extracted for use in forming a new etching solution, it is still necessary to provide new potassium iodide, which is costly (the ratio of iodide to iodine in the solution is ordinarily at least 4:1, and may range from 3 to 7 parts iodide to 1 part iodine).

Co-pending application Ser. No. 610,181, filed May 14, 1984, now abandoned (which is a continuation of Ser. No. 456,285, filed Jan. 6, 1983, now abandoned), incorporated herein by reference, discloses significantly improved processes employing iodine-iodide etching solutions in the recovery of precious metals. The processes of the invention of the co-pending application are simpler, more efficient, and less expensive than comparable processes of the prior art. In one of its broader aspects, the invention of the co-pending application provides, in a process employing an etching solution comprising iodine and iodide for the recovery of precious metal, an improvement in which a new etching solution comprising both iodine and iodide is prepared from spent etching solution by treating the spent etching solution to precipitate out, as elemental iodine, substantially all of the iodine in the iodine-iodide etching solution (in whatever form) and employing the elemental iodine to supply both the iodine and the iodide in the new etching solution. The new etching solution is formed without introducing ions foreign to the original etching solution and without producing undesirable by-products.

BRIEF DESCRIPTION OF THE INVENTION

The present invention provides new improved processes employing iodine-iodide etching solutions in the recovery of precious metals. Specific processes of the invention employ an aqueous solution of 1) hydrogen iodide, more specifically hydriodic acid and iodine, or 2) ammonium iodide and iodine. Recovery of precious metals by processes employing such aqueous solutions may be accelerated, in accordance with the invention, by the use of hydrogen peroxide or its equivalents during etching. Moreover, accelerated etching of precious metals may be achieved in other aqueous iodine-iodide solutions, such as those disclosed in the aforesaid co-pending application, by the addition of an oxidizing agent such as hydrogen peroxide or ammonium persulfate.

The invention may be used, for example, for the recovery of gold and other precious metals, such as silver, palladium, platinum, and rhodium, employed in the manufacture of electronic components and jewelry. In the manufacture of jewelry, for example, photofabrication methods may be employed in which the iodine-iodide etching solutions of the invention acquire much of the precious metal originally present on workpieces. The invention is useful in recovering precious metals present in such etching solutions and also useful in the reclamation of precious metals from scrapped parts or findings. The precious metal may be plated upon or otherwise associated with other materials, such as base metals (ferrous or non-ferrous), plastics, glass or ceramics.

In precious metal recovery in accordance with one aspect of the invention, elemental iodine is solubilized in an aqueous solution of 1) hydriodic acid, preferably formed from the reaction of iodine with an aqueous solution of hydrazine hydrate, or 2) ammonium iodide, preferably formed from the reaction of iodine with an aqueous solution of ammonium hydroxide and hydrogen peroxide, during the preparation of the etching solution. The dissolved iodine oxidizes the precious metal to an insoluble precious metal iodide, which is then complexed and also solubilized by the aqueous solution of 1) hydriodic acid or 2) ammonium iodide. After the precious metal is extracted from the etching solution, for example by adding a reducing agent thereto and filtering off the resultant precious metal precipitate, the spent solution is treated, either to oxidize it back to its original state for reuse, or, without any reuse of the spent solution, to precipitate out, as elemental iodine, substantially all of the iodine in the iodine-iodide spent solution (in whatever form), and then using the elemental iodine to supply all of the iodine and iodide of a new etching solution. The new etching solution is preferably formed without introducing ions foreign to the original etching solution and without producing undesirable by-products. When the invention is employed in the recovery of precious metal associated with base metal, the pH of the aqueous hydriodic acid, iodine etching solution is in the range of 0 to 1, while the pH of the aqueous ammonium iodide, iodine etching solution is in the neutral range. The pH of the etching solutions in the aforesaid co-pending application is neutral or slightly basic. Accelerated etching of precious metals in each of the foregoing iodine-iodide etching solutions may be achieved by the use of hydrogen peroxide or its equivalents during etching, in a manner which will be described later.

DETAILED DESCRIPTION OF PREFERRED EMBODIMENTS

1)

One of the etching solutions employed in the invention consists essentially of water, hydriodic acid and iodine, and is preferably prepared by adding hydrazine or its hydrate to de-ionized water and then adding elemental iodine. Hydriodic acid and gaseous nitrogen are formed in accordance with the following reaction:

$$2I_2 + N_2H_4 \rightarrow 4HI + N_2 \uparrow. \qquad \text{eq (1)}$$

After all the hydrazine has been converted to hydriodic acid, additional iodine is dissolved in the solution to provide the desired proportions of iodine and hydriodic acid. At this point, the solution turns dark brown, due to the formation of hydrogen tri-iodide ($HI_3$), which is soluble in the excess hydriodic acid present. This dark brown solution readily dissolves precious metals.

An aqueous solution of hydriodic acid by itself, without the addition of supplemental iodine, can be used to form the etching solution, as by adding a small amount of 30% hydrogen peroxide to oxidize some of the hydriodic acid to free iodine ions, i.e.:

$$\underset{\text{small amount}}{3HI} + H_2O_2 \longrightarrow \underset{\text{unreacted}}{HI} + 2I^- + 2H_2O. \qquad \text{eq (2)}$$

The liberated iodine ions react with the remaining unreacted hydriodic acid, to form an addition product, the deep dark brown, hydrogen tri-iodide ($HI_3$). Only enough hydrogen peroxide is added, with stirring, to the clear hydriodic acid solution to form the dark brown hydrogen tri-iodide solution, i.e.:

$$\underset{\text{water-white solution}}{HI + 2I^-} \longrightarrow \underset{\text{dark-brown solution}}{HI_3}. \qquad \text{eq (3)}$$

Adding an excess of hydrogen peroxide to the hydriodic acid solution causes all the iodine in it to precipitate out as elemental iodine, i.e.:

$$\underset{\text{clear}}{2HI} + \underset{\text{excess}}{H_2O_2} \longrightarrow I_2 \downarrow + 2H_2O. \qquad \text{eq (4)}$$

Similarly, an excess of hydrogen peroxide causes all the iodine in the dark brown hydrogen tri-iodide solution to precipitate out as elemental iodine, i.e.:

$$\underset{\text{dark-brown}}{2HI_3} + \underset{\text{excess}}{H_2O_2} \longrightarrow 3I_2 \downarrow + 2H_2O. \qquad \text{eq (5)}$$

The concentration of the etching solution, formed from the hydrogen peroxide oxidation of an aqueous solution of hydriodic acid, depends on 1) the dilution of the solution, and 2) the extent of the solution oxidation. The more the solution is oxidized, the greater the amount of iodine ions liberated. The more iodine ions liberated, the more ions there are to dissolve in the remaining hydriodic acid and thus to form the dark brown hydrogen tri-iodide. However, the solution must not be oxidized to the point where all the iodine in it is precipitated out as elemental iodine.

A concentrated etching solution, which has a deep dark brown color, may be made up on a weight basis of 1 part iodine, 3-7 parts hydriodic acid, and 5-10 parts water. A dilute one, which has a dark tea color, may be made up of 1 part iodine, 3-7 parts hydriodic acid and 100-200 parts water.

Crystalline iodine is barely soluble in a dilute solution of hydriodic acid. However, it is readily soluble in a concentrated one. Therefore, to prepare a dilute etching solution, which does contain supplemental iodine, it is necessary to start with a concentrated one. The concentrated etching solution, containing the required amount of supplemental iodine, is then diluted to the desired level.

In the dilute etching solution, color fades out after several hours because of the slow hydrolysis of the small amount of hydrogen tri-iodide present in the solution, i.e.:

$$2HI_3 + 2H_2O \rightarrow 6HI + O_2 \uparrow. \qquad \text{eq (6)}$$

Hydrogen tri-iodide is also removed from the solution when it is used in dissolving metal. However, the clear solution is easily returned to the tea colored stage by adding a small amount of hydrogen peroxide to it. This oxidizes some of the hydriodic acid to yield free iodine ions and water. The free iodine ions then combine with the remaining hydriodic acid present in the solution to form the brown colored hydrogen tri-iodide. Therefore, a dilute etching solution requires periodic reoxidation to maintain the presence of the brown hydrogen tri-iodide. The absence of the brown color is a simple indication of when the solution requires reoxidation.

| | COMPARISON OF CONCENTRATED AND DILUTE ETCHING SOLUTIONS | |
|---|---|---|
| No. | Concentrated* | Diluted** |
| 1. Approx. cost/gal. for initial solution make-up | $30 | $3 |
| 2. Approx. Troy oz. of gold dissolved/gal. | 4 | .3 |
| 3. Solution color | dark brown | tea color |
| 4. Time to dissolve 20-30 micro-inches of gold plate | 3 mins. | 24 hours |
| 5. Primarily used to remove gold from | 1. scrap material 2. photo fabrication | ore by heap leaching |
| 6. Need for periodic oxidation of the etching solution | No | Yes |

*1 part iodine, 4 parts hydriodic acid, 10 parts water
**1 part iodine, 4 parts hydriodic acid, 100 parts water It is essential than an excess of free hydriodic acid be present in the etching solution. It is required to solubilize auric iodide ($AuI_3$), for example, by converting it into the soluble iodoauric acid ($HAuI_4$) in accordance with the following reaction:

$$2Au + 2HI + 3I_2 + 6H_2O \rightarrow 2HAuI_4 \cdot 3H_2O + 3H_2O$$
$$\text{(iodoauric acid)}. \qquad \text{eq (7)}$$

In general, the following reactions describe the solvation of precious metals with aqueous hydriodic acid, iodine etching solutions employed in the invention:

FOR GOLD (Au)
eq (8)   $3I_2 + 2Au \rightarrow 2AuI_3$   (auric iodide)
eq (9)   $AuI_3 + HI \rightarrow HAuI_4$   (iodoauric acid)

-continued

| FOR SILVER (Ag) | | |
|---|---|---|
| eq (10) | $I_2 + 2Ag \rightarrow 2AgI$ | (silver iodide) |
| eq (11) | $AgI + HI \rightarrow HAgI_2$ | (iodoargentic acid) |
| FOR PALLADIUM (Pd) | | |
| eq (12) | $I_2 + Pd \rightarrow PdI_2$ | (palladous iodide) |
| eq (13) | $PdI_2 + 2HI \rightarrow H_2PdI_4$ | (iodopalladous acid) |
| FOR PLATINUM (Pt) | | |
| eq (14) | $2I_2 + Pt \rightarrow PtI_4$ | (platinic iodide) |
| eq (15) | $PtI_4 + 2HI \rightarrow H_2PtI_6$ | (iodoplatinic acid) |
| FOR RHODIUM (Rh) | | |
| eq (16) | $3I_2 + 2Rh \rightarrow 2RhI_3$ | (rhodic iodide) |
| eq (17) | $RhI_3 + 3HI \rightarrow H_3RhI_6$ | (iodorhodic acid) |
| FOR IRIDIUM (Ir) | | |
| eq (18) | $2I_2 + Ir \rightarrow IrI_4$ | (iridium tetra-iodide) |
| eq (19) | $IrI_4 + 2HI \rightarrow H_2IrI_6$ | (iodoiridic acid). |

Once gold, for example, is dissolved to form iodoauric acid, it can be precipitated out of the acid solution. Acid reducing agents that can be used for this purpose include: (1) sodium hypophosphite ($NaH_2PO_2$), (2) sulfur dioxide ($SO_2$), (3) sodium bisulfite ($NaHSO_3$), and (4) sodium meta-bisulfite ($Na_2S_2O_5$). When sodium meta-bisulfite, for example, is added to water, it hydrolyzes to yield sodium bisulfite, which reduces the iodoauric acid to metallic gold, i.e.:

$$Na_2S_2O_5 + H_2O \rightarrow 2NaHSO_3 \quad \text{eq (20)}$$

$$6NaHSO_3 + 2HAuI_4 \rightarrow 2Au\downarrow + 6NaI + 2HI + 3SO_2\uparrow + 3H_2SO_4. \quad \text{eq (21)}$$

The liberated sulfur dioxide also acts as a reducing agent for iodoauric acid, i.e.:

$$2HAuI_4 + 6H_2O + 3SO_2 \rightarrow 2Au\downarrow + 3H_2SO_4 + 8HI. \quad \text{eq (22)}$$

In aerated, very acid solutions, sulfur also reduce hydriodic acid to elemental iodine, i.e.:

$$SO_2 + 4HI \rightarrow 2I_2\downarrow + S\downarrow + 2H_2O. \quad \text{eq (23)}$$

Dissolved gold and other precious metals, such as silver, palladium, platinum, and rhodium, can be directly precipitated out of the aqueous hydriodic acid, iodine etching solution by first making the solution alkaline, i.e., pH about 8, (using sodium carbonate, sodium bicarbonate, or sodium hydroxide, or equivalents), and then treating the dissolved metal with an alkaline reducing solution such as (1) hydroxylamine, (2) sodium or potassium borohydride, or (3) hydrazine. Hydroxylamine can be prepared by neutralizing hydroxylamine hydrochloride or hydroxylamine sulfate with an alkali metal hydroxide such as potassium or sodium hydroxide. Gold, for example, may be precipitated from the aqueous hydriodic acid, iodine etching solution by making it strongly alkaline with an alkali metal hydroxide, i.e.:

$$4HAuI_4 + 16KOH \rightarrow 4Au\downarrow + 16KI + 10H_2O + 3O_2\uparrow. \quad \text{eq (24)}$$

Any free iodine in the etching solution also reacts with the alkali metal hydroxide, i.e.:

$$3I_2 + 6KOH \rightarrow 5KI + KIO_3 + 3H_2O. \quad \text{eq (25)}$$

The formed potassium iodide is water soluble, whereas the potassium iodate is only moderately so (1 gm/12 ml of water).

As stated earlier, gold, e.g., can be precipitated out of the aqueous hydriodic acid, iodine etching solution by making the solution containing the dissolved gold alkaline (pH about 8) and then adding an alkaline solution of hydroxylamine, i.e.:

$$HAuI_4 + KOH \rightarrow KAuI_4 + H_2O \quad \text{eq (26)}$$

$$2KAuI_4 + 6NH_2OH + 6KOH \rightarrow 2Au\downarrow + 3N_2\uparrow + 8KI + 12H_2O. \quad \text{eq (27)}$$

If only silver has been dissolved in the etching solution, it can be precipitated out by making the etching solution alkaline (pH about 8) and adding an alkaline solution of hydroxylamine to precipitate out the silver, i.e.:

$$2HAgI_2 + 2NH_2OH + 4KOH \rightarrow 2Ag\downarrow + 4KI + 6H_2O + N_2\uparrow. \quad \text{eq (28)}$$

Silver is also precipitated out by an alkaline solution of sodium or potassium borohydride, i.e.:

$$HAgI_2 + KOH \longrightarrow KAgI_2 + H_2O \quad \text{eq (29)}$$

$$8KAgI_2 + NaBH_4 + 8KOH \longrightarrow \quad \text{eq (30)}$$

$$8Ag\downarrow + \underset{\text{sodium meta-borate}}{NaBO_2} + 16KI + 6H_2O.$$

If desired, where several precious metals are present, they may be precipitated out simultaneously and then separated by conventional techniques. For example, gold, silver, and palladium can be dissolved in the hydriodic acid, iodine etching solution; the etching solution containing the dissolved precious metals being filtered off from the base material; the filtrate then being made alkaline (pH about 8); and all the gold, silver, and palladium in the filtrate being simultaneously precipitated out by adding an alkaline reducing solution of sodium borohydride.

If desired, the individual precious metals can be precipitated out separately. For example, gold is precipitated out of the aqueous hydriodic acid, iodine acidic etching solution with sulfur dioxide and is then filtered off. The acidic filtrate, now containing dissolved silver and palladium is made alkaline (pH about 8) and then treated with an alkaline solution of hydroxylamine to precipitate out the silver, which is then filtered off. The remaining alkaline filtrate, now containing only palladium, is then treated with an alkaline solution of sodium borohydride to precipitate out the palladium, which is then filtered off. The alkaline precipitation of palladium, from an aqueous hydriodic acid-iodine etching solution proceeds as follows:

$$\underset{\text{iodo palladous acid}}{H_2PdI_4} + 2KOH \longrightarrow \underset{\text{potassium iodo palladite}}{K_2PdI_4} + 2H_2O \quad \text{eq (31)}$$

$$\underset{\text{potassium iodo palladite}}{4K_2PdI_4} + \underset{\text{potassium borohydride}}{KBH_4} + 8KOH \longrightarrow \quad \text{eq (32)}$$

-continued $$4Pd \downarrow + KBO_2 \text{ (potassium metaborate)} + 16KI + 6H_2O.$$

In accordance with the present invention, when base metals are present, it is preferred to use the etching solution only once (thereby avoiding problems of contamination and diminished efficiency). After the etching solution has been used once and all the precious metals have been precipitated out and filtered off, substantially all of the iodine in the iodine-iodide spent etching solution is precipitated out, as elemental iodine, according to the general equation:

$$2I^- + 2H^+ + H_2O_2 \rightarrow I_2 \downarrow + 2H_2O. \qquad \text{eq (33)}$$

In some instances base metals are not present. After the newly prepared dark brown etching solution has been used for the first time in dissolving pure gold, for example, the gold is precipitated out with an acidic reducing agent. The solution color changes from a dark brown to colorless or light yellow. After the gold has been filtered off, the filtrate can be oxidized back to its original state by the slow addition of 30% hydrogen peroxide with stirring until the clear or light yellow solution becomes dark brown again. This solution is now ready for etching pure gold material a second time. The cycle of etching, reduction, filtration and oxidation can be carried out several times before the solution becomes spent. At this time, substantially all the iodine in the acidic iodine-iodide etching solution is precipitated out, as elemental iodine, by slowly adding an excess of hydrogen peroxide and stirring, and a new etching solution is prepared using the precipitated elemental iodine to supply both the iodine and iodide in the new etching solution.

In most cases a newly prepared etching solution is used only once, since base metals are dissolved along with the gold and greatly decrease the effectiveness of the etching solution. After the gold has been precipitated out with an acidic reducing agent, and filtered off, substantially all of the iodine in the iodine-iodide etching solution is precipitated out, as elemental iodine, by adding excess hydrogen peroxide.

In accordance with the invention, the elemental iodine precipitated out of the spent etching solution is employed to supply both the iodine and the hydriodic acid in a new etching solution. The filtrate left after filtering off the precipitated iodine contains dissolved base metals. These dissolved base metals may be precipitated out of this waste solution by the addition of an alkaline peroxide, such as sodium peroxide. This will precipitate out dissolved base metals as hydroxides or oxides, which can be filtered off.

The precipitated iodine may be filtered off into a large ceramic filter, fitted to a suitably trapped vacuum system. The iodine is then washed with de-ionized water and then with a dilute mineral acid (such as hydrochloric acid, sulfuric acid, or nitric acid) to remove any trace of base metal and is finally washed a second time with de-ionized water. After the final washing, the iodine is dried by drawing air through it, via a vacuum or water aspiration system. Some of the elemental iodine is then reacted with aqueous hydrazine hydrate, to form hydriodic acid, which is then employed in the preparation of a new etching solution. The remainder of the elemental iodine provides the supplemental iodine that must be added to the newly prepared aqueous hydriodic acid solution to form a totally new etching solution. Only a very small fraction (less than 1%) of the original iodine is lost.

This method of forming a new etching solution avoids the production of by-products that are detrimental and also avoids the introduction of materials in the new solution that were not present in the original solution. The hydriodic acid does not have to be separated from its aqueous solution, since by the proper addition of water and the remaining iodine extracted from the spent etching solution, a new aqueous hydriodic acid, iodine etching solution is formed having the desired ratio of iodine to hydriodic acid to water.

Gold is easily dissolved in an aqueous solution of ammonium iodide containing supplemental iodine. A concentrated etching solution may vary from 1 part iodine, to 3-7 parts ammonium iodide, to 5-10 parts water, on a weight basis.

The ammonium iodide is prepared by adding elemental iodine to water, then adding 30% hydrogen peroxide and finally adding slowly, and with stirring, a solution of ammonium hydroxide.

Iodine is barely soluble and barely reacts with an aqueous solution of ammonium hydroxide. However, it readily dissolves in and reacts with the ammonium hydroxide when hydrogen peroxide is present. The ammonium iodide that forms is readily soluble in the aqueous solution. No ammonium iodate is formed in this reaction, in contrast to the potassium iodate that forms in the reaction between iodine and potassium hydroxide, i.e.:

$$I_2 + H_2O_2 + 2NH_4OH \xrightarrow{\text{clear water white sol.}} 2NH_4I + 2H_2O + O_2 \uparrow. \qquad \text{eq (34)}$$

The end point of the reaction between ammonium hydroxide and iodine, in the formation of ammonium iodide, is easily determined, namely, when all the iodine has dissolved to form a clear solution of ammonium iodide. The newly formed ammonium iodide aqueous solution should be free of any ammonia odor. If an odor is present, it indicates the presence of excess ammonium hydroxide. The excess can be eliminated by 1) adding additional iodine and hydrogen peroxide, or 2) by carefully neutralizing it with a mineral acid. The presence of sufficient hydrogen peroxide is easily recognized by the constant formation of oxygen bubbles in the solution. The presence of a small excess of hydrogen peroxide does not affect the preparation of the etching solution. The addition of supplemental iodine to the aqueous ammonium iodide solution changes its color from a clear water-white to a deep dark brown. The dark brown color is due to the formation of ammonium tri-iodide, i.e.:

$$\underset{\text{clear water white sol.}}{NH_4I} + I_2 \longrightarrow \underset{\text{dark brown sol.}}{NH_4I_3}. \qquad \text{eq (35)}$$

Ammonium iodide may also be prepared by the following reactions:

1) from ammonium hydroxide and hydriodic acid, i.e.:

$$NH_4OH + HI \rightarrow NH_4I + H_2O \quad \text{eq (36)}$$

or 2) from ammonium carbonate and hydriodic acid $$(NH_4)_2CO_3 \cdot H_2O + 2HI \rightarrow 2NH_4I + 2H_2O + CO_2\uparrow. \quad \text{eq (37)}$$

The pH of the aqueous ammonium iodide, iodine etching solution is about neutral and its attack on base metals is moderate. On the other hand, the pH of the hydriodic acid, iodine etching solution is 0–1 and its attack on base metals is severe. The pH of the ammonium iodide, iodine etching solution is preferably maintained in the range of 6.8 to 7.6 by suitable buffering (using sodium acetate or dibasic ammonium phosphate, for example) to minimize base metal etching.

Gold is dissolved in the aqueous ammonium iodide, iodine etching solution in a two step procedure, i.e.:

$$3I_2 + 2Au \longrightarrow 2AuI_3 \text{ (Auric iodide)} \quad \text{eq (38)}$$

$$AuI_3 + NH_4I \longrightarrow NH_4AuI_4 \text{ (Ammonium auric iodide).} \quad \text{eq (39)}$$

Precious metals are precipitated out of the aqueous ammonium iodide, iodine etching solution by the same reducing agents as those used in reducing potassium iodide, iodine etching solutions or hydriodic acid, iodine etching solutions, for example with sodium metabisulfite, i.e.:

$$Na_2S_2O_5 + H_2O \rightarrow 2NaHSO_3 \quad \text{eq (40)}$$

$$6NaHSO_3 + 2NH_4AuI_4 \rightarrow 2Au\downarrow + 6NaI + 2NH_4I + 3SO_2\uparrow + 3H_2SO_4. \quad \text{eq (41)}$$

After the etching solution containing the dissolved gold is reduced, the gold precipitate is filtered off. The reduced clear light yellow filtrate may be oxidized back to its original dark brown color, by adjusting the pH to about with sodium bicarbonate and then slowly adding 30% hydrogen peroxide with stirring. The etching solution is now ready for further precious metal etching.

All the iodine in a spent aqueous ammonium iodide, iodine etching solution can be precipitated out as elemental iodine by making the spent solution acid, pH 2–3, with a mineral acid, and slowly adding, with constant stirring, a 30% solution of hydrogen peroxide. The precipitated elemental iodine is then filtered off and washed sequentially with 1) de-ionized water, 2) a dilute mineral acid, to dissolve traces of base metal, and 3) de-ionized water. The reclaimed elemental iodine is then used to form a new aqueous ammonium iodide solution and also to supply the supplemental iodine required in the preparation of a new etching solution.

3)

Processes in accordance with the invention can be carried out in a ceramic container or in one made from polypropylene, polyvinylchloride, enameled steel, or Teflon-coated steel, for example. Advantageously, an agitator or tumbler (of the same or similar materials) is used during the etching or stripping operation. Little or no agitation is required during precipitation of precious metals. Any suitable means may be used to remove the precipitated precious metals. Settling and decanting, vacuum filtration, filtering the solution through a filter press, or centrifuging are convenient procedures for such removal.

If desired, the speed of the processes of the invention can be increased by either heating the etching solution or applying an electromotive force to the solution, using the material to be deplated as an anode. However, it is ordinarily not necessary to use such measures, since the processes are faster than the conventional cyanide process.

4)

If accelerated etching of precious metals is desired, it is preferred to use hydrogen peroxide (or its equivalents) as will now be described.

The solvation rate of gold in an ammonium iodide, iodine etching solution s considerably accelerated by frequent small additions of hydrogen peroxide, which may range in concentration from about 3% to about 30%. The hydrogen peroxide is fed into the bottom of the etching solution very slowly and in very small amounts. Only enough is added to form a steady evolution of oxygen bubbles in the etching solution. In a similar manner, the frequent addition of small amounts of about 3% hydrogen peroxide to an aqueous hydriodic acid, iodine etching solution considerably accelerates the solvation rate of the precious metal immersed in the solution. Small additions of about 3% hydrogen peroxide do not initiate iodine precipitation in this very acid solution, the way the addition of a 30% hydrogen peroxide would. The solvation rate of precious metals in an aqueous iodine, alkali metal iodide (e.g., potassium iodide) etching solution is also considerably accelerated by frequent small additions of about 3% to about 30% hydrogen peroxide to the etching solution. Again, the hydrogen peroxide is fed into the bottom of the etching solution in very small amounts and very slowly. Only enough is added to form a steady evolution of oxygen bubbles in the etching solution while it is being utilized. Instead of using hydrogen peroxide for accelerating etching of gold or other precious metals, ammonium persulfate or other oxygen-liberating compounds may be employed, all of which appear to act as a catalyst for the etching of precious metals in aqueous iodine-iodide etching solutions.

Ammonium persulfate is a strong oxidizing agent and is unstable in aqueous solution, decomposing to form ammonium sulfate, sulfuric acid, hydrogen peroxide and oxygen, i.e.:

$$(NH_4)_2S_2O_8 + H_2O \longrightarrow \underset{\text{Caro's acid}}{H_2SO_5} + (NH_4)_2SO_4 \quad \text{eq (42)}$$

$$H_2SO_5 + H_2O \longrightarrow H_2O_2 + H_2SO_4 \quad \text{eq (43)}$$

$$2H_2O_2 \longrightarrow 2H_2O + O_2\uparrow. \quad \text{eq (43)}$$

The oxidation by Caro's acid is slow at room temperature but is catalyzed by several of the transition metal ions, i.e., $Mn^{+3}$, $Fe^{+2}$, $Cu^{+2}$, $Ag^{+1}$, and $Hg^{+2}$.

A concentrated solution of ammonium persulfate may be made up by dissolving 100 gms in 150 ml of water. Ten cc of this concentrated solution of ammonium persulfate is added per liter of iodine-iodide-water etching solution.

The addition of a concentrated aqueous solution of ammonium persulfate to a spent, acidified iodine-iodide etching solution will precipitate out, as elemental iodine, substantially all of the iodine present in the etching solution in whatever form.

5)

In general, the standard commercial cyanide gold stripping solution will dissolve 0.7 troy ounces of gold per gallon of solution, while the aqueous etching solutions of the invention, comprising 1) hydriodic acid and iodine or 2) ammonium iodide and iodine, will dissolve about 4.0 troy ounces of gold per gallon of solution. Gold recovered by the iodine-iodide etching solutions has a purity of 99% (while that recovered from the cyanide etching solution has a purity of about 98%). The amount of residual gold remaining in the filtrate after gold precipitation has been found to be less than 6 ppm as determined by atomic absorption analysis. An even higher purity gold can be obtained by repeating the process, that is, redissolving the gold in a new aqueous iodine-iodide etching solution and then precipitating it out again.

Since a process in accordance with the invention may start with elemental iodine and end with elemental iodine, progress of the process may be monitored visually. Changes in color during the sequence of steps from an opaque dark brown color of the initial etching solution to a clear light yellow color for the reduced solution are readily observed and avoid the need for complex solution analysis. An aqueous solution of potassium hydroxide in a spray tower may be used to collect the small amount of iodine or hydriodic acid vapor, for example, which may escape from the solution during processing.

While the invention has special usefulness in dissolving and recovering precious metals in the electronics and jewelry industries, the invention may also be used in the extraction of precious metals from ores. In processing such ores, the ore is commonly ground to a fineness that can be sifted through a 200 mesh per inch screen. It is then treated with the etching solutions of the invention according to the procedures set forth herein.

EXAMPLES

The following examples are illustrative of the application of the invention to the recovery of precious metals with aqueous etching solutions comprising 1) hydriodic acid and iodine, or 2) ammonium iodide and iodine. The particular materials referred to are for illustrative purposes only, as is apparent from the foregoing descriptions. In each experiment all the iodine used was recovered from earlier precious metal recovery operations by the techniques already described.

Examples are also given to show that the addition of hydrogen peroxide (or a similar oxidizing agent) to an iodine-iodide etching solution increases its etching rate for precious metals.

EXAMPLE I

Experiment 1

An aqueous solution of hydriodic acid was prepared starting with water, hydrazine hydrate and iodine. The solution was prepared according to the following equation:

$$2I_2 + N_2H_4 \cdot H_2O \longrightarrow 4HI + N_2 \uparrow + H_2O \quad \text{eq (45)}$$

| | | | | | |
|---|---|---|---|---|---|
| Mol. wt. | 254 | 50 | 128 | 28 | 18 |
| Gms reacting | 508 | 50 | 512 | 28 | 18 |

Since the etching solution being prepared was on a weight basis of 1-part iodine, 4-parts hydriodic acid and 10-parts water, the amount of material to prepare 1 liter of solution was 100-gms iodine, 400-gms hydriodic acid and 1000-ml of water.

The factor applied to eq (45) to determine the necessary starting weights to prepare 400 gms of hydriodic acid in aqueous solution was $400 \div 512 = 0.78$. Then the weight of the starting material needed to prepare 400 gms of hydriodic acid was calculated as follows:

$N_2H_4 \cdot H_2O = 50$ gms $\times$ factor $.78 = 39$ gms required
$2I_2 = 508$ gms $\times$ factor $.78 = 396$ gms required.

An aqueous solution containing 400 gms of hydriodic acid was prepared as follows:

(1) 500 ml of de-ionized water was placed in a 2-liter beaker.

(2) 39 gms of hydrazine hydrate were added and stirred.

(3) 396 gms of iodine were added slowly and stirred until dissolved.

Experiment 2

The solution from Experiment 1, which contained 400 gms of hydriodic acid dissolved in 500 ml of water, was now used to prepare an aqueous hydriodic acid, iodine etching solution.

One hundred (100) gms of iodine were added to the hydriodic acid solution and stirred until it all dissolved. A deep dark brown solution formed. This was then diluted with water to form a 1000-ml 1-4-10 iodine, hydriodic acid, water, precious metal etching solution.

Experiment 3

A 200-ml aliquot of the etching solution was taken from the 1-liter parent etching solution prepared in Experiment 2. Glass plates having a vacuum metallized gold film on them were placed in the etching solution. The gold film dissolved off in 3 minutes at room temperature. The dissolved gold was precipitated out of the acidic etching solution by adding solid crystals of sodium meta-bisulfite and stirring. The solution color changed from a deep dark brown to a clear light yellow. All the gold was precipitated out in 30 minutes and was then filtered off. The filtrate was then oxidized back to its original deep dark brown state by the slow dropwise addition of 30% hydrogen peroxide while stirring the solution. This oxidized etching solution was then used a second time for dissolving vacuum metallized gold films from glass plates. The gold was precipitated out a second time with sodium meta-bisulfite and then filtered off. The filtrate was oxidized a second time, back to its original deep brown state, with 30% hydrogen peroxide. This cycle was repeated two more times for a total of four gold film etching cycles. Substantially, all of the iodine in the acidic iodine-iodide etching solution was precipitated out, as elemental iodine, by the slow addition, with stirring, of excess 30% hydrogen peroxide. Elemental iodine was filtered off, and washed with de-ionized water, then with dilute nitric acid, and finally with de-ionized water and then air dried. The free elemental iodine was now available for preparing a new etching solution.

Experiment 4

A second 200-ml aliquot of the etching solution was taken from the 1-liter parent etching solution as prepared in Experiment 2. Gold plated nickel, copper, and Kovar base materials were immersed in the etching solution. All the gold dissolved off in 10 minutes at room temperature. The stripping solution, now containing the dissolved gold plus some of the dissolved base metal, was filtered off. The filtrate was then made alkaline, pH about 8, with an alkaline hydroxide. The dissolved gold was precipitated out of the alkaline solution by the addition of an alkaline solution of hydroxylamine. The solution went from a deep dark opaque brown to a clear light yellow color. All the gold precipitated out within 30 minutes and was filtered off. Substantially, all of the iodine in the iodine-iodide clear filtrate was then precipitated out, as elemental iodine, by making the solution acid, pH 2-3, with a concentrated mineral acid. The solution was then stirred to aerate it. The precipitated elemental iodine was then filtered off, washed and dried as described in Experiment 3. The free elemental iodine was then available to make up a new etching solution.

Experiment 5

A third 200-ml aliquot of the etching solution was taken from the 1-liter parent etching solution prepared in Experiment 2. Gold plated nickel, copper, and Kovar base materials were immersed in the etching solution. All the gold was etched off in 10 minutes at room temperature. The etching solution, now containing dissolved gold plus some of the dissolved base metal, was filtered off from the base materials. The dissolved gold was precipitated out of the acidic etching solution with sulfur dioxide, directed to the bottom of the etching solution by means of a small-bore glass tube. The color of the solution went from a dark opaque brown to a clear light yellow. All the gold precipitated out within 30 minutes at room temperature, and was filtered off. Substantially, all of the iodine in the iodine-iodide clear acidic filtrate was precipitated out, as elemental iodine, by slowly adding excess 30% hydrogen peroxide while stirring. The precipitated elemental iodine was filtered off, and washed and dried as in Experiment 3.

Experiment 6

A fourth 200-ml aliquot of the etching solution was taken from 1-liter parent etching solution as prepared in Experiment 2. Gold and silver plated nickel and copper base parts were placed in the etching solution. All the gold and silver dissolved off in 10 minutes at room temperature. The etching solution, now containing the dissolved gold, silver, plus some dissolved base metal was filtered off from the base materials. The gold in the acidic filtrate was precipitated out with sulfur dioxide and then filtered off. The remaining acidic filtrate, now containing dissolved silver plus some of the dissolved base metal was made slightly alkaline, pH about 8, with an alkaline hydroxide. The dissolved silver was precipitated out of the alkaline filtrate by the addition of an alkaline solution of hydroxylamine. Precipitation was complete within 30 minutes and the metallic silver was then filtered off. The alkaline filtrate was then treated with a mineral acid to lower the pH to about 2-3. Thirty percent hydrogen peroxide was slowly added, while stirring, to precipitate out, as elemental iodine, substantially all of the iodine in the iodine-iodide clear acidic filtrate. The precipitated elemental iodine was filtered off and washed and dried as described in Experiment 3.

Experiment 7

The fifth and final 200-ml aliquot of the etching solution was taken from the 1-liter parent etching solution as prepared in Experiment 2. Palladium and platinum coatings were dissolved off of scrap base materials placed in the etching solution. The palladium and platinum coatings were dissolved off in 10 minutes at room temperature. The solution containing the dissolved palladium and platinum plus some dissolved base metal was filtered off from the base material. The acidic filtrate was then made alkaline, pH about 8, by the addition of an alkaline hydroxide. The dissolved palladium and platinum were precipitated out of the alkaline solution by the addition of an alkaline solution of sodium borohydride. The solution went from a deep opaque brown to a clear light yellow color. All the palladium and platinum precipitated out within 30 minutes and was filtered off. Substantially, all of the iodine in the iodine-iodide clear filtrate was precipitated out, as elemental iodine, by adding a mineral acid to lower the pH to 2-3 and then slowly adding 30% hydrogen peroxide, with stirring. The elemental iodine was filtered off, and washed and dried as described in Experiment 3. The free iodine was then available to make up a new etching solution.

EXAMPLE II

Experiment 1

An aqueous solution of ammonium iodide was prepared starting with water, iodine, hydrogen peroxide and ammonium hydroxide. The solution was prepared according to the following equation, i.e.:

$$I_2 + 2NH_4OH + H_2O_2 \longrightarrow 2NH_4I + 2H_2O + O_2 \uparrow \qquad \text{eq (46)}$$

| | | | | | | |
|---|---|---|---|---|---|---|
| Mol. wt. | 254 | 35 | 34 | 145 | 18 | 32 |
| Gms reacting | 254 | 70 | 34 | 290 | 36 | 32 |

Since the etching solution being prepared was on a weight basis of 1-part iodine, 4-parts ammonium iodide and 10-parts water, the amount of material required to prepare 1-liter of the etching solution was 100-gms iodine, 400-gms ammonium iodide and 1000-ml of water.

The factor applied to eq (46) to determine the necessary starting weights to prepare 400 gms of ammonium iodide in aqueous solution was 400÷290=1.38. Then the weight of the starting material needed to prepare 400 gms of ammonium iodide was calculated as follows:

$2NH_4OH = 70$ gms × factor 1.38 = 97 gms
$I_2 = 254$ gms × factor 1.38 = 351 gms
$H_2O_2 = 34$ gms × factor 1.38 = 47 gms An aqueous solution containing 400 gms of ammonium iodide was prepared as follows:

(1) 500 ml of de-ionized water was placed in a 2-liter beaker.

(2) 351 gms of iodine were added.

(3) 47 gms of hydrogen peroxide were added and stirred.

(4) 97 gms of ammonium hydroxide were slowly added and stirred until all the iodine dissolved.

(5) 100 gms of supplemental iodine were added and stirred until the deep dark brown solution formed and all the iodine had dissolved.

(6) The dark brown solution was then diluted to 1-liter.

Experiment 2

A 200-ml aliquot of the 1-liter etching solution was transferred to a 400 ml beaker. Several small parts, plated with 20-30 micro-inches of gold were immersed in the etching solution at room temperature, for 5 minutes. Small amounts of hydrogen peroxide were intermittently fed dropwise into the bottom of the beaker containing the etching solution, so as to form a slow and steady stream of oxygen bubbles rising to the surface of the etching solution. The parts were then removed and rinsed. All the gold plate had dissolved off within 5 minutes at room temperature and the remaining base metal was left bright and only slightly etched. The dissolved gold was precipitated out of the etching solution by adding, slowly and with stirring, crystals of sodium meta-bisulfite, until the deep dark brown etching solution changed to a light yellow color. A fine gold precipitate settled out within 30 minutes and was filtered off. The filtrate was then oxidized by adjusting the pH to about 6 with sodium bicarbonate and then slowly adding 30% hydrogen peroxide with stirring. The solution color changed from light yellow to deep dark brown. A second collection of similarly gold plated small parts was immersed in the restored etching solution for 5 minutes. Again, all the gold plate dissolved off within 5 minutes and was then precipitated out with sodium meta-bisulfite. The gold precipitate was then filtered off. During the second reduction operation the color of the etching solution again went from dark brown to light yellow. This time the clear light yellow filtrate was acidified, pH 2-3, with hydrochloric acid. A 30% solution of hydrogen peroxide was slowly added, with stirring, to the acidified filtrate. All the iodine in the ammonium iodide-iodine etching solution was precipitated out as elemental iodine. It was filtered off and washed sequentially with 1) de-ionized water, 2) dilute hydrochloric acid, and 3) de-ionized water. The elemental iodine was now available for making up a new ammonium iodide, iodine etching solution.

EXAMPLE III

The following comparative experiments demonstrated that the addition of hydrogen peroxide to both concentrated and diluted iodine-iodide-water etching solutions accelerated their gold etching rate. An aqueous solution of ammonium persulfate also achieved accelerated etching, when added to aqueous iodine-iodide etching solutions.

Comparative Experiments 1

Fifteen ml. of the standard concentrated (1-4-10) iodine-ammonium iodide-water etching solution was dispensed into each of 2 small beakers. These were labeled (A) and (B). Etching solution (A) was used just as prepared for the etching test. However, 30% hydrogen peroxide was fed into etching solution (B), at a rate of 2 drops/min. all during the etching test and produced a steady stream of fine oxygen bubbles in etching solution (B). Small gold plated caps were then immersed in each of the etching solutions. It took 10 minutes to dissolve off all of the gold from the gold plated caps immersed in the untreated etching solution (A), whereas, it took only 3 minutes to dissolve off all of the gold from the gold plated caps immersed in etching solution (B), treated with hydrogen peroxide. The exposed base metal of the caps etched in solution (B) was bright, shiny and barely etched.

Etching solutions (A) and (B) were diluted with water to double the volume of each. These new solutions were labeled (A-1) and (B-1). Again, 30% hydrogen peroxide was fed into the diluted etching solution (B-1), at a rate of 2 drops/min., all during the etching test. Small gold plated caps were immersed in each of the diluted etching solutions. It took 30 minutes to dissolve off about 98% of the gold from the gold plated caps immersed in the diluted and untreated etching solution (A-1), whereas, it took only 5 minutes to dissolve off all of the gold from the gold plated caps immersed in the diluted etching solution (B-1), treated with hydrogen peroxide. The exposed base metal of the caps etched in solution (B-1) was bright, shiny and barely etched.

Accelerated etching rates were also achieved by adding a concentrated solution of ammonium persulfate (100 gms/150 ml of water) to the etching solution instead of hydrogen peroxide. The ammonium persulfate was added at the rate of 2 drops/min.

Comparative Experiments 2

Similar comparative experiments were performed with respect to the aqueous solutions of potassium iodide and iodine disclosed in the aforesaid co-pending application. 50 ml of a standard 1-4-10 etching solution were divided into two parts and labeled solution (C) and solution (D). Solution (C) was used just as prepared. However, solution (D) was treated with 30% hydrogen peroxide while gold plate was being dissolved in the solution. The hydrogen peroxide was added dropwise, at frequent intervals, so that a constant stream of oxygen bubbles formed in the etching solution and rose to its surface. It took 18 minutes to dissolve all of the gold from a gold plated cap immersed in solution (C) but only 3 minutes to dissolve all the gold from an identical gold plated cap immersed in solution (D).

Five ml of solution (C) and solution (D) were transferred to 2 small beakers. Each solution was diluted with water so as to double the volume of each. These diluted etching solutions were labeled (C-1) and (D-1). Etching solution (C-1) was used just as prepared during the etching test. Etching solution (D-1) was treated with 30% hydrogen peroxide, at a rate of 2 drops/min. during the etching test. Identical gold plated caps were immersed in each of the etching solutions. After an immersion time of 30 minutes, much of the gold plate was still left on the caps immersed in the diluted, untreated etching solution (C-1), whereas, after only 5 minutes, all of the gold was dissolved off the gold plated caps immersed in the diluted etching solution (D-1) treated with hydrogen peroxide.

Accelerated etching rates were also achieved by adding a concentrated solution of ammonium persulfate (100 gms/150 ml of water) to the etching solution instead of hydrogen peroxide. The ammonium persulfate was added at the rate of 2 drops/min.

Comparative Experiments 3

Similar comparative experiments were performed using aqueous solutions of hydriodic acid and iodine. When 3% hydrogen peroxide was added to an aqueous solution of hydriodic acid and iodine at the rate of 8 drops per minute to 10 ml of etching solution, the etching rate increased substantially without precipitating any iodine in this very acid solution. The time required to dissolve all the gold on a gold plated cap was reduced by 75% to 85%, compared to the etching time required without hydrogen peroxide.

EXAMPLE IV

The addition of a concentrated solution of ammonium persulfate to aqueous iodine-iodide etching solutions will precipitate out, as elemental iodine, substantially all of the iodine present in the etching solution, in whatever form, since it both acidifies and oxidizes the etching solution at the same time. This was demonstrated in the following experiments:

Experiment 1

A concentrated solution of ammonium persulfate was made up by dissolving 100 gms of the salt in 150 ml of water. 10 ml were then added to 20 ml of each of the following three spent, standard aqueous iodine-iodide etching solutions:
1. (1-4-10) iodine-ammonium iodide-water etching solution
2. (1-4-10) iodine-potassium iodide-water etching solution
3. (1-4-10) iodine-hydriodic acid-water etching solution In each case, substantially all of the iodine, present in whatever form, in each etching solution, was precipitated out as elemental iodine. The color in each etching solution went from a deep dark brown to a very light yellow. The precipitated iodine was filtered off and washed sequentially with de-ionized water, a dilute mineral acid and again with de-ionized water. The elemental iodine was now available for the preparation of a new iodide and also to supply the free iodine required in the make-up of a new iodine-iodide etching solution.

Experiment 2

20 ml of each of the three different aqueous iodine-iodide etching solutions were poured into a 400 cc beaker. 30 ml of the concentrated ammonium persulfate etching solution were added and stirred. Substantially, all of the iodine, present in whatever form, in the 60 cc of these three mixed etching solutions, was precipitated out as elemental iodine. The solution color went from a deep dark brown to a very light yellow. The elemental iodine was filtered off and washed sequentially with de-ionized water, a dilute mineral acid and again with de-ionized water.

While preferred embodiments of the invention have been described, it will be apparent to those skilled in the art that changes can be made in these embodiments without departing from the principles and spirit of the invention, the scope of which is defined in the appended claims.

The invention claimed is:

1. A process for reclaiming precious metal from a precious metal bearing material, comprising dissolving the precious metal in an aqueous iodine, hydriodic acid etching solution, precipitating the dissolved precious metal by the addition of a reducing agent, removing the precipitated precious metal to reclaim it, adding an oxidizing agent to the solution to oxidize it substantially back to its original state, using the oxidized solution for dissolving additional precious metal from precious metal bearing material, and, after such reuse, treating the reused etching solution to precipitate, as elemental iodine, substantially all of the iodine in the reused iodine-iodide etching solution, and forming a new iodine, hydriodic acid etching solution by using the precipitated elemental iodine to supply both the iodine and iodide of the new etching solution, wherein the forming of the new etching solution comprises adding sufficient hydrogen peroxide to an aqueous hydriodic acid solution to form a dark brown hydrogen tri-iodide etching solution.

2. A process for reclaiming precious metal from a precious metal bearing material, comprising dissolving the precious metal in an aqueous iodine, hydriodic acid etching solution, precipitating the dissolved precious metal by the addition of a reducing agent, removing the precipitated precious metal to reclaim it, adding an oxidizing agent to the solution to oxidize it substantially back to its original state, using the oxidized solution for dissolving additional precious metal from precious metal bearing material, and, after such reuse, treating the reused etching solution to precipitate, as elemental iodine, substantially all of the iodine in the reused iodine-iodide etching solution, and forming a new iodine, hydriodic acid etching solution by using the precipitated elemental iodine to supply both the iodine and iodide of the new etching solution, wherein the treating of the reused etching solution to precipitate elemental iodine comprises the addition of a concentrated aqueous solution of ammonium persulfate which simultaneously acidifies and oxidizes the reused etching solution.

3. A process for reclaiming precious metal from a precious metal bearing material, comprising dissolving the precious metal in an aqueous iodine, ammonium iodide etching solution, precipitating the dissolved precious metal by the addition of a reducing agent, removing the precipitated precious metal to reclaim it, adding an oxidizing agent to the solution to oxidize it substantially back to its original state, using the oxidized solution for dissolving additional precious metal from precious metal bearing material, and after such reuse treating the reused etching solution to precipitate, as elemental iodine, substantially all of the iodine in the reused iodine-iodide etching solution, and forming a new iodine, ammonium iodide etching solution by using the precipitated elemental iodine to supply both the iodine and iodide of the new etching solution, wherein the treating of the reused etching solution to precipitate elemental iodine comprises the addition of a concentrated aqueous solution of ammonium persulfate which simultaneously acidifies and oxidizes the reused etching solution.

4. A process for the reclamation of precious metal that comprises providing elemental iodine, employing part of the iodine to form ammonium iodide in aqueous solution, employing said solution to solubilize additional iodine, employing the solubilized iodine to oxidize precious metal to insoluble precious metal iodide, complexing and solubilizing said precious metal iodide in said solution, precipitating the precious metal from said solution and extracting the precious metal therefrom to reclaim it, treating the remaining solution to precipitate, as elemental iodine, substantially all of the iodine in the iodine-iodide etching solution, and employing the precipitated elemental iodine to repeat the process, using the precipitated elemental iodine to provide both the iodine and the iodide required to repeat the process, wherein the precious metal is gold, and wherein the complexing and solubilizing produces ammonium auric iodide.

* * * * *

UNITED STATES PATENT AND TRADEMARK OFFICE
CERTIFICATE OF CORRECTION

PATENT NO. : 5,137,700

DATED : August 11, 1992

INVENTOR(S) : Hilbert Sloan

It is certified that error appears in the above-identified patent and that said Letters Patent is hereby corrected as shown below:

On the cover sheet item [54], and at the top of column 1, the title of the invention should read --PROCESSES EMPLOYING IODINE-IODIDE ETCHING SOLUTIONS IN THE RECOVERY OF PRECIOUS METALS--.

Column 4:
lines 59-60,
"$2Au+2HI+3I_2+6H_2O \rightarrow HAuI_4 \cdot 3H_2O+3H_2O$ (iodoauric acid).    eq (7)"
should read:
--$2Au+2HI+3I_2+6H_2O \rightarrow HAuI_4 \cdot 3H_2O+3H_2O$ (iodoauric acid).    eq (7)--.

UNITED STATES PATENT AND TRADEMARK OFFICE
CERTIFICATE OF CORRECTION

PATENT NO. : 5,137,700

DATED : August 11, 1992

INVENTOR(S) : Hilbert Sloan

It is certified that error appears in the above-identified patent and that said Letters Patent is hereby corrected as shown below:

Column 5:
    line 29, "$SO_2- +3H_2SO_4.$" should read --$SO_2\uparrow +3H_2SO_4.$--;
    line 36, --dioxide can-- should be inserted after "sulfur".

Column 9:
    line 42, --6-- should be inserted after "about".

Column 10:
    line 16, "s" should read --is--;
    line 58, "eq (43)" should read --eq (44)--.

Signed and Sealed this

Seventh Day of December, 1993

Attest:

BRUCE LEHMAN

Attesting Officer     Commissioner of Patents and Trademarks